United States Patent
Wennersten et al.

(10) Patent No.: US 11,567,167 B2
(45) Date of Patent: Jan. 31, 2023

(54) METHOD, DEVICE, AND SYSTEM FOR INTERFERENCE REDUCTION IN A FREQUENCY-MODULATED CONTINUOUS-WAVE RADAR UNIT

(71) Applicant: Axis AB, Lund (SE)

(72) Inventors: Johan Wennersten, Lund (SE); Anders Lloyd, Lund (SE)

(73) Assignee: Axis AB, Lund (SE)

( * ) Notice: Subject to any disclaimer, the term of this patent is extended or adjusted under 35 U.S.C. 154(b) by 431 days.

(21) Appl. No.: 16/596,323

(22) Filed: Oct. 8, 2019

(65) Prior Publication Data
US 2020/0116849 A1    Apr. 16, 2020

(30) Foreign Application Priority Data
Oct. 12, 2018   (EP) .................................... 18200055

(51) Int. Cl.
*G01S 7/02* (2006.01)
*G01S 7/35* (2006.01)
*G01S 13/34* (2006.01)

(52) U.S. Cl.
CPC .............. *G01S 7/023* (2013.01); *G01S 7/352* (2013.01); *G01S 13/34* (2013.01); *G01S 7/356* (2021.05)

(58) Field of Classification Search
CPC .......... G01S 7/023; G01S 7/352; G01S 7/354; G01S 7/356; G01S 13/32; G01S 13/34; G01S 13/91; G01S 13/343; G01S 13/345; G01S 13/352; G01S 13/536; G01S 13/867; G01S 13/931; G01S 2013/93271; G01S 2013/93272; G01S 2013/93274; G01S 7/2922
See application file for complete search history.

(56) References Cited

U.S. PATENT DOCUMENTS

| 6,094,160 A | 7/2000 | Lajiness |
| 6,121,918 A | 9/2000 | Tullsson |
| 7,339,518 B2 * | 3/2008 | Natsume ............... G01S 13/345 342/111 |

(Continued)

FOREIGN PATENT DOCUMENTS

| DE | 102015119482 A1 | 5/2017 |
| EP | 3244229 A1 | 11/2017 |

(Continued)

OTHER PUBLICATIONS

Searched Report Provided by UPPDRAGSHUSET (dated Aug. 3, 2018).
Extended European Search Report dated Apr. 5, 2019 for the European Patent Application No. 18200055.4.

*Primary Examiner* — Olumide Ajibade Akonai
(74) *Attorney, Agent, or Firm* — Volpe Koenig

(57) ABSTRACT

A method for interference reduction in a stationary radar unit of a frequency-modulated continuous-wave (FMCW) type is provided. A sequence of beat signals is received, and a reference beat signal is calculated as an average or a median of one or more of the beat signals in the sequence. By comparing a difference between a beat signal and the reference beat signal, or a derivative of the difference, to one or more thresholds, a segment which is subject to interference is identified. The segment of the beat signal is replaced by one or more of a corresponding segment of an adjacent beat signal in the sequence, and a corresponding segment of the reference beat signal.

18 Claims, 6 Drawing Sheets

(56) References Cited

U.S. PATENT DOCUMENTS

| | | |
|---|---|---|
| 9,897,685 B2 | 2/2018 | Ossowska et al. |
| 9,952,312 B2 * | 4/2018 | Corbett .................. G01S 7/023 |
| 11,029,388 B2 * | 6/2021 | Melzer ..................... G01S 7/40 |
| 2006/0007036 A1 * | 1/2006 | Natsume .................. G01S 3/74 |
| | | 342/107 |
| 2006/0125682 A1 | 6/2006 | Kelly, Jr. et al. |
| 2008/0094274 A1 * | 4/2008 | Nakanishi ............... G01S 7/354 |
| | | 342/91 |
| 2008/0231496 A1 * | 9/2008 | Sakamoto ............... G01S 7/354 |
| | | 342/159 |
| 2009/0096661 A1 | 4/2009 | Sakamoto |
| 2015/0168539 A1 * | 6/2015 | Himmelstoss ........ G01S 13/931 |
| | | 342/159 |
| 2015/0260828 A1 | 9/2015 | Ossowska |
| 2015/0301157 A1 | 10/2015 | Ossowska et al. |
| 2016/0291130 A1 | 10/2016 | Ginsburg et al. |
| 2017/0219689 A1 | 8/2017 | Hung et al. |

FOREIGN PATENT DOCUMENTS

| | | | |
|---|---|---|---|
| JP | 2001502425 A * | 10/1997 | .............. G01S 7/36 |
| JP | 2004 347362 A | 12/2004 | |
| JP | 2004-347362 A | 12/2004 | |
| WO | 98/33073 A1 | 7/1998 | |

* cited by examiner

METHOD, DEVICE, AND SYSTEM FOR INTERFERENCE REDUCTION IN A FREQUENCY-MODULATED CONTINUOUS-WAVE RADAR UNIT

FIELD OF INVENTION

The present teachings relate to the field of frequency-modulated continuous-wave (FMCW) radar. In particular, it relates to a method, device, and system for interference reduction in a stationary radar unit of a FMCW type.

BACKGROUND

Using radar for surveillance monitoring and in vehicles becomes more and more popular as this allows the distance, velocity, and angle of objects to be measured. For example, a radar unit may be used as a complement to a surveillance camera to provide information about objects in the scene. As the use of radars becomes more common, there is an increasing risk that different radars start to interfere with each other. To exemplify, a radar used to monitor traffic may be subject to interference from radars mounted in vehicles passing by. As a consequence of the interference, the function of the radar may worsen or completely fail in worst case.

An approach of reducing interference is to set all disturbed data samples in the base band radar data to zero. However, that approach introduces artifacts as the radar data is transformed and processed in the frequency domain to calculate distances, velocities, and angles of objects. These artifacts may in the end lead to false detection of objects. There is thus room for improvements.

SUMMARY

In view of the above, it is thus an object of the present teachings to mitigate the above problems and provide a way of reducing interference in a radar unit of FMCW type that gives rise to as little artifacts as possible. According to a first aspect, the above object is achieved by a method for interference reduction in a stationary radar unit of a frequency-modulated continuous-wave (FMCW) type, comprising: receiving a sequence of beat signals corresponding to a first sequence of signals transmitted by a radar unit, wherein each beat signal is a mix of its corresponding signal in the first sequence of signals transmitted by the radar unit and a signal received by a receive antenna of the radar unit in response thereto; calculating a reference beat signal as an average or a median of one or more of the beat signals in the sequence of beat signals; identifying, for a beat signal in the sequence of beat signals, a segment of the beat signal which is subject to interference from a transmitter which is separate from the radar unit, wherein the segment is identified by comparing at least one of a difference between the beat signal and the reference beat signal, and a derivative of the difference, to one or more thresholds; and reducing the interference in the beat signal by replacing the segment of the beat signal, wherein the segment of the beat signal is replaced by one or more of a corresponding segment of an adjacent beat signal in the sequence of beat signals, and a corresponding segment of the reference beat signal.

FIG. 1 schematically illustrates a sequence of c beat signals 2 each having s time samples 3. The c beat signals 2 are organized next to each other along the horizontal axis of FIG. 1, starting with the first signal, and the time samples of each beat signal are arranged along the vertical axis. If the radar unit is subject to interference, each beat signal 2 will be disturbed in a segment thereof. However, different beat signals 2 will be disturbed in different segments. When the beat signals 2 are organized in the manner of FIG. 1, the interference typically turns up as a band 1 as illustrated in FIG. 1. The band 1 has a shape which will differ depending on the characteristics of the signals transmitted by the radar unit in relation to the characteristics of the interfering signals.

Since different beat signals are disturbed in different segments, the disturbed values of the beat signals will have little impact on an average or a median calculated with respect to corresponding time samples of the beat signals. Further, since the radar unit is stationary, changes between the beat signals in the sequence are reasonably small. Thereby, the beat signals can be expected to be similar to the calculated average or median, apart for those time intervals where the beat signals are disturbed.

It is therefore proposed to calculate such an average or median and use it as a reference signal for the purpose of identifying a disturbed segment of a beat signal. In that way, a disturbed segment of the beat signal may be identified with high precision.

Further, the reference signal or an adjacent beat signal in the sequence may be used for replacing a disturbed segment of the beat signal. In that way, the disturbed segment of the beat signal is replaced by a corresponding segment of a signal which can be expected to be quite similar to the beat signal. This will give rise to less artifacts when the beat signals are processed in the frequency domain compared to replacing disturbed samples with zeros.

It is further noted that the calculation and use of the reference beat signal for interference reduction is easy to implement and has a low computational complexity. Accordingly, the proposed method allows for interference reduction at a low computational cost.

By reducing interference in the radar unit is generally meant reducing disturbances caused by a transmitter of a unit which is separate from the radar unit.

As known in the field of FMCW radars, a beat signal is a mix of a signal transmitted by the radar unit and a signal received by the radar unit in response thereto. A beat signal is sometimes also referred to as an intermediate frequency, IF, signal.

The first sequence of signals transmitted by the radar unit may correspond to a time frame. The signals transmitted by an FMCW radar are sometimes referred to as chirps. This type of radar is therefore sometimes referred to as Chirp-Sequence FMCW.

The average or median of one or more of the beat signals refers to an average or median calculated between the one or more beat signals. In more detail, an average or median is calculated with respect to corresponding time samples of the one or more beat signals.

The transmitter which is separate from the radar unit may be a transmitter of another radar unit. However, also other types of transmitters operating in the same frequency band as the radar unit may give rise to interference.

A derivative of the difference could be any derivative of the difference, including the first derivative, the second derivative, the third derivative, etc.

By a segment of a beat signal is meant a time period of the beat signal. Since a beat signal comprises time samples, a segment of a beat signal hence comprises one or more consecutive time samples. A corresponding segment of another signal refers to a corresponding time period, such as, the same time period of the other signal. It is to be understood that the beat signal may be subject to interference in more than one segment. The method may include identifying and replacing each such segment.

A beat signal which is next to a certain beat signal in the sequence is referred to as an adjacent beat signal in the sequence. The adjacent beat signal can either be before or after the certain beat signal in the sequence.

Processing of radar signals is often made in real time. It is therefore desirable to have interference reducing methods which can operate on the fly. For that purpose, the proposed method may be performed sequentially so as to introduce minimal delays in the system. In particular, the identification of segments which are subject to interference, and the replacement of these segments may be performed in a sequential fashion as the beat signals are received. More specifically, the method may further comprise processing the sequence of beat signals sequentially, wherein the steps of identifying and reducing are applied sequentially to beat signals in the sequence of beat signals. By sequential processing means that the beat signals in the sequence are processed one after the other in the order they appear in the sequence.

The reference beat signal may be calculated as an average or median of all beat signals in the sequence of beat signals. By including all beat signals when calculating the reference beat signal, the impact of any disturbed signal values on the reference beat signal is minimized. However, this requires that all beat signals in the sequence are available before the reference signal can be calculated. Consequently, the identification and replacement of beat signal segments which are subject to interference cannot be started until all beat signals have been received.

As an alternative, the calculation of the reference beat signal can be included in the sequential processing of the beat signals such that an average or a median is calculated from the beat signals which have been received that far. In more detail, the processing the sequence of beat signals sequentially may further comprise sequentially repeating the step of calculating a reference beat signal, wherein the reference beat signal is calculated as an average or a median of beat signals that either precede a currently processed beat signal in the sequence of beat signals, or precede and include a currently processed beat signal in the sequence of beat signals. In that way, the calculation of the reference signal, as well as the identification and replacement of beat signal segments which are subject to interference, may be started as soon as a beat signal is received. Accordingly, the data can be processed on the fly.

In case the calculation of the reference beat signal is included in the sequential processing of the beat signals, different approaches may be taken for how to calculate the reference beat signal for the first beat signal in the sequence.

According to a first approach, the radar unit may send out a further sequence of signals before the first sequence of signals. The further sequence of signals may be referred to as a pre-sequence of signals. The pre-sequence of signals may be seen as an extension of the first sequence of signals. In practice, the radar unit will send out a single sequence of signals which includes the pre-sequence followed by the first sequence of signals. In response to the further sequence of signals, the radar unit receives a further sequence of beat signals. A reference beat signal may be calculated from the further sequence of beat signals and used as a reference beat signal for the first beat signal in the sequence. In more detail, the method may further comprise: receiving a further sequence of beat signals corresponding to a further sequence of signals transmitted by the radar unit before and in direct connection to the first sequence of signals transmitted by the radar unit, wherein, when processing a first beat signal in the sequence of beat signals, the reference beat signal is calculated as an average or a median of the beat signals in the further sequence of beat signals. In this way, a good start value for the reference beat signal is achieved already when the first beat signal in the sequence is to be processed.

According to a second approach, when processing a first beat signal in the sequence of beat signals, the reference beat signal is set to be equal to the first beat signal in the sequence of beat signals. With this approach there is no need for the radar unit to transmit the further sequence of signals. However, the identification and reduction of interference will typically be worse for the first few beat signals in the sequence of beat signals compared to the first approach described above.

As explained above, identification of a segment of a beat signal which is subject to interference may be based on the difference between the beat signal and the reference signal. Such a segment may be found by thresholding the absolute value of the difference itself and/or by thresholding the absolute value of a derivative of the difference. For example, a segment may be identified as a time period of the beat signal where any of the absolute values of the difference and a derivative of the difference exceeds first and second thresholds, respectively. In other words, in the step of identifying, the segment is identified as a part of the beat signal where at least one of the difference and said derivative of the difference deviates from zero by more than a first threshold and a second threshold, respectively.

A segment of a beat signal which is subject to interference may be replaced by a corresponding segment of an adjacent beat signal in the sequence, and/or by a corresponding segment of the reference signal. Replacement of the segment of the beat signal by a corresponding segment of an adjacent beat signal may be made on a condition that the adjacent beat signal is not subject to interference in the corresponding segment. In more detail, the segment may only be replaced by a corresponding segment of an adjacent beat signal if the corresponding segment of the adjacent beat signal has not been identified as being subject to interference from a transmitter which is separate from the radar unit. In this way, it is avoided that a defect segment is replaced by another defect segment.

In the step of reducing the interference, the segment of the beat signal may be replaced by the corresponding segment of an adjacent beat signal if the corresponding segment of the adjacent beat signal has not been identified as being subject to interference from a transmitter which is separate from the radar unit, and otherwise the segment of the beat signal may be replaced by the corresponding segment of the reference beat signal. Replacement by a corresponding segment of an adjacent beat signal may hence take precedence over replacement by a corresponding segment of the reference beat signal, as long as the adjacent beat signal is not subject to interference in the concerned segment. This approach has been found to lead to fewer artifacts in the end.

It is also possible to combine replacement by an adjacent beat signal and replacement by the reference signal in a segment which is subject to interference. In more detail, in the step of reducing the interference, a first portion of the segment of the beat signal may be replaced by a corresponding first portion of the adjacent beat signal, and a second portion of the segment of the beat signal may be replaced by a corresponding second portion of the reference beat signal.

In this way, there is a greater flexibility in the choice between replacement by an adjacent beat signal and the reference beat signal.

For example, the adjacent beat signal may be identified as being subject to interference from a transmitter which is separate from the radar unit in a segment corresponding to the second portion but not in a segment corresponding to the first portion. Therefore, the adjacent beat signal may advantageously be used to replace the beat signal in the first portion of the segment, but not in the second portion of the segment.

The radar unit may have more than one receive antenna. In that case, the method may be performed for each receive antenna of the radar unit. The method may hence efficiently be used to reduce interference in beat signals corresponding to each of the receive antennas.

According to a second aspect, the above object is achieved by a device for reducing interference in beat signals generated by a stationary radar unit of a frequency-modulated continuous-wave (FMCW) type, comprising: a receiver configured to receive a sequence of beat signals corresponding to a first sequence of signals transmitted by the radar unit, wherein each beat signal is a mix of its corresponding signal in the first sequence of signals transmitted by the radar unit and a signal received by a receive antenna of the radar unit in response thereto; a calculator configured to calculate a reference beat signal as an average or a median of one or more of the beat signals in the sequence of beat signals; an identifier configured to identify, for a beat signal in the sequence of beat signals, a segment of the beat signal which is subject to interference from a transmitter which is separate from the radar unit, wherein the identifier is configured to identify the segment by comparing at least one of a difference between the beat signal and the reference beat signal, and a derivative of the difference, to one or more thresholds; and an interference reducer configured to reduce the interference in the beat signal by replacing the segment of the beat signal, wherein the interference reducer is configured to replace the segment of the beat signal by one or more of a corresponding segment of an adjacent beat signal in the sequence of beat signals, and a corresponding segment of the reference beat signal.

According to a third aspect, the above object is achieved by a frequency-modulated continuous-wave (FMCW) radar system for interference reduction, comprising: a radar unit comprising: a transmit antenna configured to transmit a first sequence of signals, a receive antenna configured to receive a second sequence of signals in response to the first sequence of signals transmitted by the transmit antenna, and a mixer configured to mix the first sequence of signals and the second sequence of signals to generate a sequence of beat signals; and a device according to the second aspect, wherein the device is arranged downstream of the radar unit to reduce interference in the sequence of beat signals generated by the mixer.

According to a fourth aspect, there is provided a non-transitory computer-readable medium having computer code instructions stored thereon adapted to carry out the method according to the first aspect when executed by a device having processing capability.

The second, third, and fourth aspects may generally have the same features and advantages as the first aspect. It is further noted that the present teachings relate to all possible combinations of features unless explicitly stated otherwise.

BRIEF DESCRIPTION OF THE DRAWINGS

The above, as well as additional objects, features and advantages of the present teachings, will be better understood through the following illustrative and non-limiting detailed description of embodiments of the present teachings, with reference to the appended drawings, where the same reference numerals will be used for similar elements, wherein.

DETAILED DESCRIPTION

The present teachings will now be described more fully hereinafter with reference to the accompanying drawings, in which embodiments of the present teachings are shown. The systems and devices disclosed herein will be described during operation.

Figure 2:
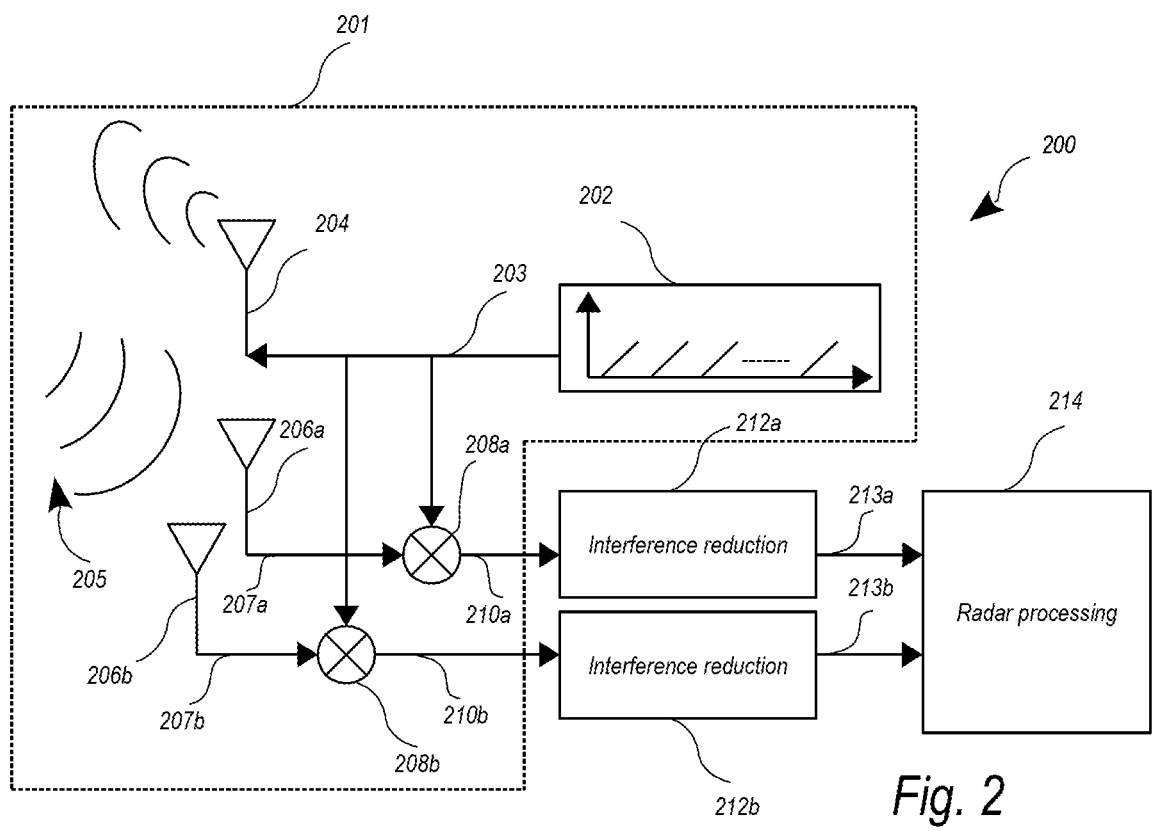
FIG. 2 schematically illustrates a radar system according to embodiments.

FIG. 2 illustrates a FMCW radar system 200. The radar system 200 may be used as a complement to a video camera. For example, the radar system 200 may be included in a video camera. The radar system 200 comprises a radar unit 201 and one or more interference reduction devices 212a, 212b. The radar system may also comprise a radar processing device 214. The radar unit 201 comprises one or more transmit antennas 204, one or more receive antennas 206a, 206b, and one or more mixers 208a, 208b. The radar unit 201 may also comprise a synthesizer 202.

Figure 7:
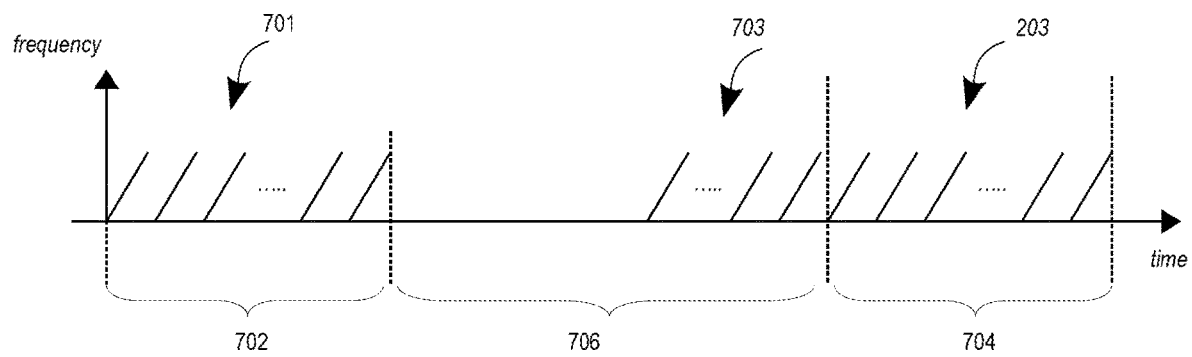
FIG. 7 schematically illustrates a first sequence of signals transmitted by a radar unit, and a further sequence of signals transmitted before and in direct connection to the first sequence of signals according to embodiments.

The transmit antenna 204 is configured to transmit sequences of signals. The sequences of signals may be transmitted in frames. For example, the transmit antenna 204 may send out a sequence of signals in a first frame. Then the transmit antenna 204 may be silent for a while before sending out a further sequence of signals in a second frame. FIG. 7 illustrates a sequence of signals 701 which is transmitted in a first frame 702, and another sequence of signals 203 which is transmitted in a second frame 704.

In particular, the transmit antenna 204 may send out a first sequence of signals 203. The first sequence of signals 203 may correspond to the frame 704. The first sequence of signals 203 may be generated by the synthesizer 202. Each signal in the first sequence 203 may be a sinusoid whose frequency increases linearly with time—sometimes also referred to as a chirp.

The signals in the transmitted first sequence of signals 203 are reflected off objects in the scene. The reflected signals 205 are then received by each receive antenna 206a, 206b at different angles. Each receive antenna 206a, 206b hence receives a sequence of signals 207a, 207b in response to the first sequence of signals 203 transmitted by the transmit antenna 204. In addition to the reflected signals 205, the receive antennas 206a, 206b may receive signals which are transmitted from transmitters which are not part of the radar unit 201, such as transmitters of other radar units. Those signals will be superposed with the reflected signals 205 at the receive antennas 206a, 206b. Each received sequence of signals 207a, 207b may hence have a component stemming from the reflected signals 205, and another component stemming from interfering transmitters. Here two receive antennas 206a, 206b are illustrated. In practice, however, the radar system 200 may have any number of receive antennas.

Figure 1:
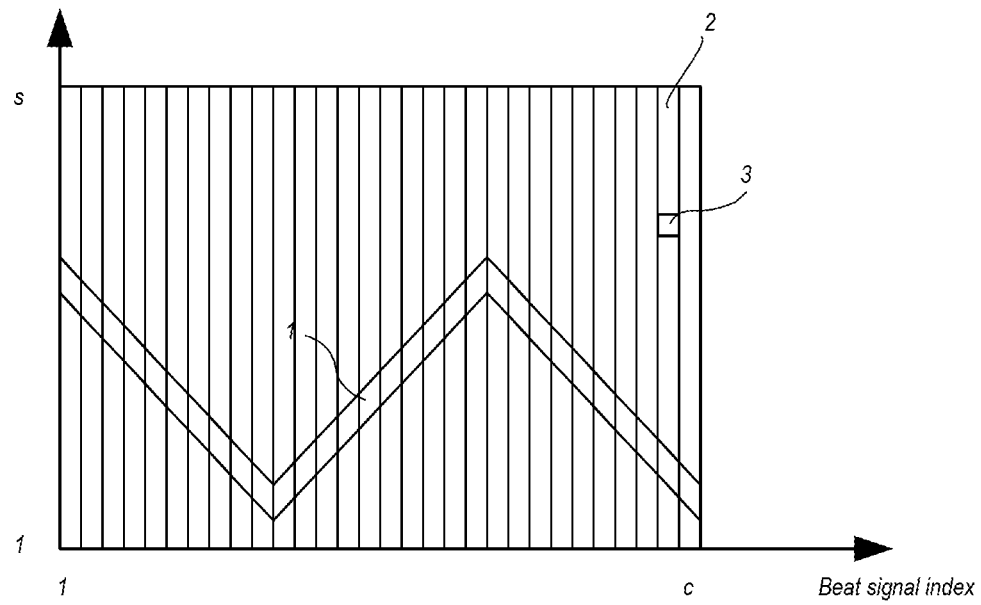
FIG. 1 schematically illustrates a sequence of beat signals which is subject to interference.

Each of the sequence of signals 207a, 207b received by the receive antennas 206a, 206b, are then mixed with the first sequence of signals 203 by a corresponding mixer 208a, 208b. In principle, each mixer 208a, 208b mixes its input signals by calculating a product of the input signals. The output signals generated by the mixers 208a, 208b are referred to as a sequence of beat signals or intermediate frequency signals. Accordingly, a sequence of beat signals 210a, 210b is generated for each receive antenna 206a, 206b. The mixer 208a, 208b serves to change the frequency band its input signals. While the signal 203 sent out by the transmitter 204 may be in the Ghz-range, the beat signals are typically in the MHz-range. The sequences of beat signals 210a, 210b may be said to constitute the base band data of the radar system 200. As illustrated in FIG. 1, each sequence of beat signals 210a, 210b may be subject to interference.

Each sequence of beat signals 210a, 210b corresponding to a receive antenna is then input to an interference reduction device 212a, 212b. The role of the interference reduction device 212a, 212b is to reduce interference caused by a transmitter which is separate from the radar unit 201. The interference reduction device 212a, 212b outputs a sequence of beat signals 213a, 213b having reduced impact of interference.

Once the interference reduction devices 212a, 212b have reduced the impact of interference in the sequences of beat signals 210a, 210b, the radar processing unit 214 proceeds to process the sequences of beat signals 213a, 213b having reduced impact of interference. The radar processing device 214 may perform any known type of radar processing, such as frequency analysis to calculate the distance, velocity, and angle of objects in the scene. This includes range and Doppler FFT (Fast Fourier Transform, FFT), and angle digital beamforming. The processing of the radar processing device 214 may give rise to artifacts in the resulting distance, velocity, and angle signals in case there is interference in the sequences of beat signals 210a, 210b which has not been properly removed. However, the interference reduction devices 212a, 212b as described herein efficiently reduce the interference in the sequences of beat signals 210a, 210b such that the amount of artifacts introduced during processing of the radar processing device 214 is kept as low as possible.

Figure 3:
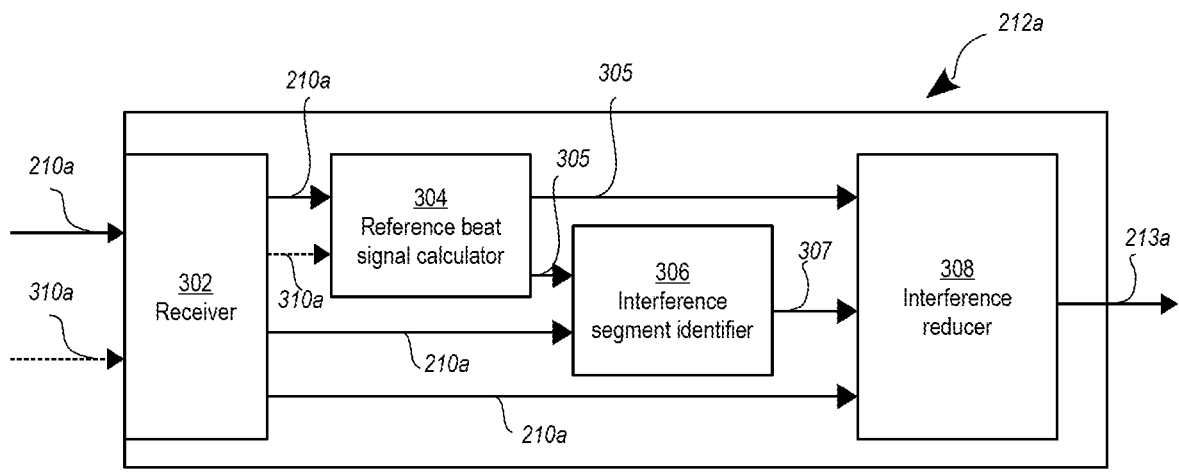
FIG. 3 schematically illustrates a device for reducing interference in beat signals according to embodiments.

FIG. 3 illustrates the interference reduction device 212a in more detail. The interference reduction device 212a comprises a receiver 302, a reference beat signal calculator 304, an interference segment identifier 306, and an interference reducer 308.

The interference reduction device 212a thus comprises various components 302, 304, 306, 308 which are configured to implement the functionality of the device 212a. In particular, each illustrated component corresponds to a functionality of device 212a. Generally, the device 212a may comprise circuitry which is configured to implement the components 302, 304, 306, 308 and, more specifically, their functionality.

In a hardware implementation, each of the components 302, 304, 306, 308 may correspond to circuitry which is dedicated and specifically designed to provide the functionality of the component. The circuitry may be in the form of one or more integrated circuits, such as one or more application specific integrated circuits. By way of example, the interference reducer 308 may thus comprise circuitry which, when in use, reduces interference in a beat signal in the sequence 210a.

In a software implementation, the circuitry may instead be in the form of a processor, such as a microprocessor, which in association with computer code instructions stored on a (non-transitory) computer-readable medium, such as a non-volatile memory, causes the device 212a to carry out any method disclosed herein. In that case, the components 302, 304, 306, 308 may thus each correspond to a portion of computer code instructions stored on the computer-readable medium, that, when executed by the processor, causes the device 212a to carry out the functionality of the component.

It is to be understood that it is also possible to have a combination of a hardware and a software implementation, meaning that the functionality of some of the components 302, 304, 306, 308 are implemented in hardware and others in software.

Figure 4:
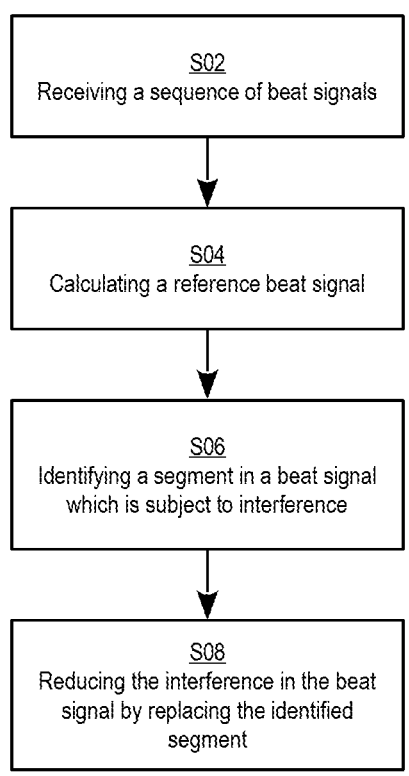
FIG. 4 is a flow chart of a method for interference reduction in a stationary radar unit of FMCW type according to embodiments.

The operation of the interference reduction device 212a will now be described in more detail with reference to FIG. 3 and the flow charts of FIGS. 4 and 5.

In step S02, the receiver 302 receives a sequence of beat signals 210a. As explained above, the sequence of beat signals 210a corresponds to the first sequence of signals 203 transmitted by the transmit antenna 204 of the radar unit 201. For example, each beat signal in the received sequence of beat signals 210a may be a mix of a corresponding signal in the first sequence of signals 203 and the signal received by one of the receive antennas 206a, 206b in response thereto. In the following, the notation $x_{n,m}$, n=1, . . . , s, m=1, . . . , c is used for the sequence of beat signals 210a, where n is an index of the time samples in a beat signal, m is an index of the beat signal in the sequence 210a, s is the number of time samples of a beat signal, and c is the number of beat signals in the sequence 210a. Accordingly, $x_{n,m}$ refers to time sample n of beat signal m.

In step S04, the reference beat signal calculator 304 calculates a reference beat signal 305 as an average or a median of one or more of the beat signals in the sequence of beat signals 210a. Generally, time sample n of the reference beat signal 305 may be calculated as an average or a median of time sample n of all or a subset of the beat signals in the sequence of beat signals 210a. If time sample n of the reference beat signal is denoted by $\bar{x}_n$, n=1, . . . , s, the reference beat signal 305 may be calculated according to one of:

$$\bar{x}_n = \text{mean}(x_{n,m}; m \subseteq \{1, \ldots, c\}), n = 1, \ldots, s$$

$$\bar{x}_n = \text{median}(x_{n,m}; m \subseteq \{1, \ldots, c\}), n = 1, \ldots, s.$$

In a first group of embodiments, the reference beat signal 305 is calculated once and the same reference beat signal 305 is used by the interference segment identifier 306 and the interference reducer 308 when processing each beat signal in the sequence 210a. In that situation, the reference beat signal 305 is typically calculated as an average or median of all beat signals in the sequence 210a. In a second group of embodiments, a reference beat signal 305 is calculated per beat signal in the sequence 210a. For example, the reference beat signal 305 corresponding to beat signal m may be calculated based on the preceding beat signals 1, . . . , m−1 in the sequence 210a, or based on beat signals 1, . . . , m that precede and include beat signal m. In the latter of these two cases, time sample n of the reference beat signal $\bar{x}_{n,m}$ corresponding to beat signal m, may be calculated as one of:

$$\bar{x}_{n,m} = \text{mean}(x_{n,j}; j = 1, \ldots, m) = \frac{1}{m}\sum_{j=1}^{m} x_{n,j}, n = 1, \ldots, s$$

$$\bar{x}_{n,m} = \text{median}(x_{n,j}; j = 1, \ldots, m), n = 1, \ldots s.$$

Figure 5:
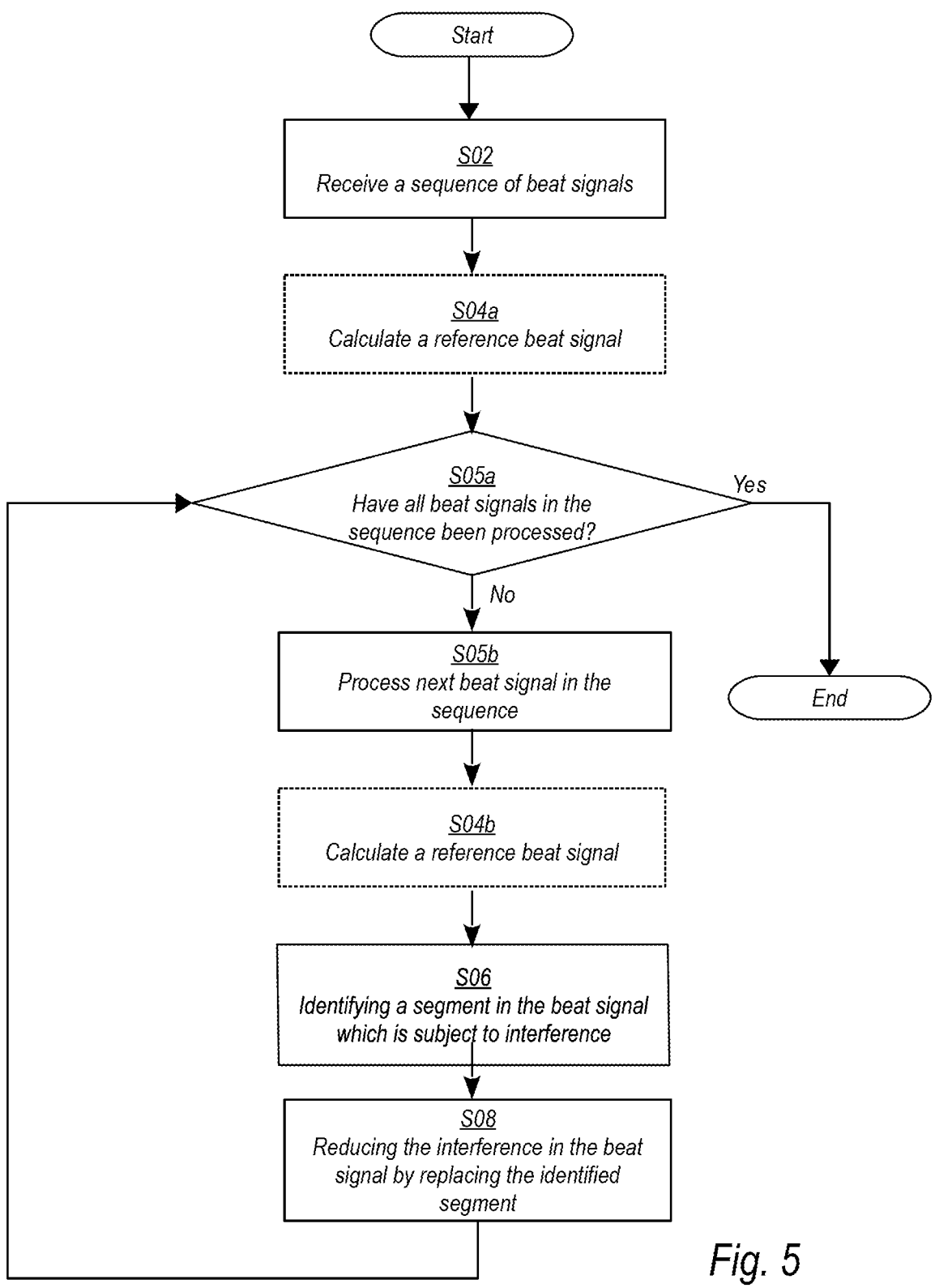
FIG. 5 is a flow chart of a method for interference reduction in a stationary radar unit of FMCW type according to embodiments, wherein the beat signals are processed sequentially.

Calculating a reference beat signal 305 per beat signal in the sequence 210a may be advantageous if the beat signals are processed sequentially Sequential processing of beat signals is further illustrated in the flow chart of FIG. 5. More specifically, the beat signals 210a are processed one at a time in the order they are received in the sequence. In step S05a it is checked whether all beat signals in the sequence have been processed. If not, the interference reduction device 212a proceeds to step S05b of processing the next beat signal in the sequence 210a. In the first group of embodiments referred to above, the reference beat signal calculator 304 may, in step S04a, calculate a reference beat signal 305 before starting the sequential processing. In the second group of embodiments referred to above, the reference beat signal calculator 304 may instead, in step S04b, calculate a reference beat signal 305 for each beat signal in the sequence 210a as it is processed.

In some embodiments, the device 212a does not process each beat signal in the sequence 210a. For example, the device 212a may in some cases process every second beat signal in the sequence 210a. The beat signals which are not processed may still be used for the purpose of replacing segments in the processed beat signals which are subject to interference.

Figure 6:
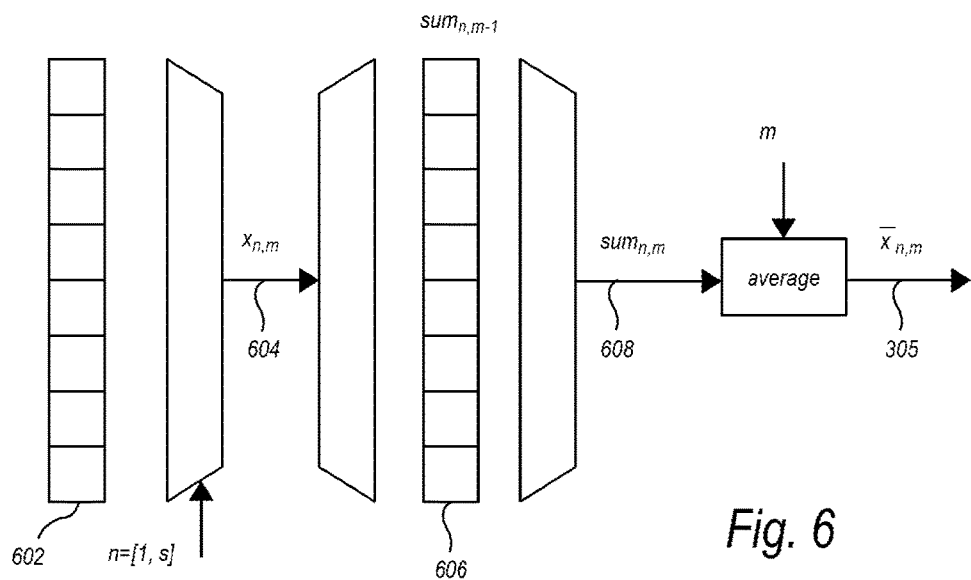
FIG. 6 schematically illustrates how a reference beat signal may be calculated according to embodiments.

FIG. 6 illustrates a possible implementation of the reference beat signal calculator 304 for carrying out step S04b when beat signal with index m is about to be processed. The reference beat signal calculator 304 may read in a time sample 604 from a currently processed beat signal 602 which is stored in memory. Generally, the time sample 604 may correspond to time sample n of beat signal m, such as, $x_{n,m}$. Then, the reference beat signal calculator 304 may use the time sample 604 to update an accumulated sum 606 of corresponding time samples n from previously processed beat signals 1, . . . , m−1 in the sequence. In more detail, the reference beat signal calculator 304 may use $x_{n,m}$ to calculate a sum 608 according to:

$$sum_{n,m} = sum_{n,m-1} + x_{n,m} = \sum_{j=1}^{m-1} x_{n,j} + x_{n,m}.$$

For each processed beat signal m, the reference beat signal calculator 304 may write the accumulated sum, $sum_{n,m}$, to memory such that it can be used when processing the next beat signal. The reference beat signal calculator 304 may then use the updated accumulated average $sum_{n,m}$ to calculate the reference beat signal 305 corresponding to the currently processed beat signal m as $$\bar{x}_{n,m} = \frac{sum_{n,m}}{m}.$$

It is to be understood that FIG. 6 only shows one possible implementation of the reference beat signal calculator 304. If the average instead is to be based on beat signals which proceed, but not include, the currently processed beat signal, the reference beat signal 305 which is output in FIG. 6 may instead be used in connection to processing reference beat signal m+1. Further, if the average instead is to be calculated with respect to all beat signals in the sequence 201a, the accumulated sum 606 may first be updated with respect to each of the c beat signals prior to calculating the average by dividing the accumulated sum by the number c of beat signals.

In the examples given above, the preceding beat signals in the sequence 210a are given the same weight when calculating the reference beat signal 305. However, it is also possible to give different weights to the preceding beat signals when calculating the reference beat signal 305. In other words, the reference beat signal 305 may be calculated as a weighted average. The weights may, for instance, be set according to a decaying function, such that more recent beat signals are given higher weight than older beat signals.

In practice, this may be implemented by using weights when updating the accumulated sum 606 to calculate the sum 608 according to $$sum_{n,m} = w_1 \cdot sum_{n,m-1} + w_2 \cdot x_{n,m} = w_1 \sum_{j=1}^{m-1} x_{n,j} + w_2 \cdot x_{n,m},$$

where $w_1 + w_2 = 1$.

It is also possible to only include some of the preceding beat signals when calculating the reference beat signal 305. A sliding window approach may be used where a window including a predetermined number of most recent beat signals are used for calculating the reference beat signal 305. For example, the reference beat signal 305 corresponding to the beat signal with index m may be calculated from the beat signals with indexes m−M up until, and possibly including, index m for some predetermined number M.

As explained above, the reference beat signal calculator 304 may, during the sequential processing of the sequence 210a of beat signals, calculate the reference beat signal 305 as a median or average with respect to earlier beat signals in the sequence 210a. When the reference beat signal 305 is calculated with respect to the first beat signal in the sequence 210a, the reference beat signal calculator 304 will typically set the reference beat signal 305 to be equal to the first beat signal in the sequence 210a. In the end, this causes the interference identification and reduction to perform worse for the first few beat signals in the sequence 210a.

To improve on the performance, the transmit antenna 204 of the radar unit 201 may extend the first sequence of signals 203 with a further sequence of signals which is transmitted before and in direct connection to the first sequence of signals 203. The further sequence may hence be seen as a pre-sequence to the first sequence 203. This is further illustrated in FIG. 7. Between the time frames 702 and 704, there may be a time interval 706 where the transmit antenna 204 usually is silent. The further sequence of signals 703 is transmitted in such a silent time interval 706 before the frame 704 corresponding to the first sequence 203. The shape of and the temporal distance between the signals in the further sequence 703 may be the same as for the first sequence 203. Also, the temporal distance between the last signal of the further sequence 703 and the first signal of the first sequence 203 may be the same as the temporal distance between the signals of the first sequence 203. In this sense, the further sequence 703 is transmitted before and in direct connection to the first sequence 203.

In the same way as the first sequence of signals 203 has a corresponding sequence of beat signals 210a-b for each receive antenna 206a-b, the transmitted further sequence of signals 703 has a corresponding further sequence of beat signals for each receive antenna 206a-b.

As illustrated in FIG. 3, the receiver 302 of the interference reduction device 212a may receive such a further sequence of beat signals 310a in addition to the sequence of beat signals 210a. The reference beat signal calculator 304 may, in step S04b, use the further sequence of beat signals 310a to calculate a reference beat signal 305 to be used in connection with the first beat signal in the sequence of beat signals 210a. For example, the reference beat signal calculator 304 may calculate the reference beat signal 305 for the first beat signal in the sequence of beat signals 210a as a median or an average of the signals in the further sequence 301a according one of:

$$\bar{x}_{n,0} = \text{mean}(y_{n,j}; j=1, \ldots, k), n=1, \ldots, s, \text{ or}$$

$$\bar{x}_n = \text{median}(y_{n,j}; j=1, \ldots, k), n=1, \ldots, s,$$

where $y_{n,j}$ denotes time sample n of beat signal j in the further sequence of beat signals 310a.

Once the reference beat signal calculator 304 has calculated a reference beat signal 305, the interference segment identifier 306 proceeds to identify one or more segments 307 in a beat signal which are subject to interference from an interfering transmitter. As shown in the flow chart of FIG. 5, the interference segment identifier 306 may operate in a sequential fashion, such that the beat signals in the sequence 210a are processed one at a time in the order they appear in the sequence 210a.

Figure 9:
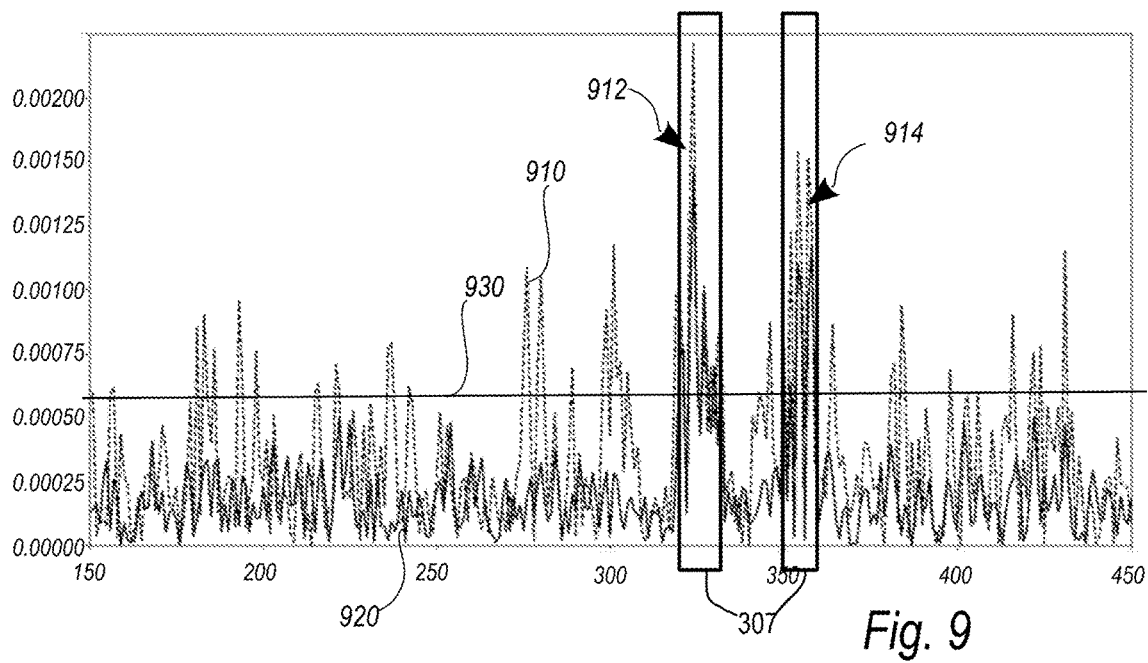
FIG. 9 illustrates thresholding of a difference between a beat signal and a reference beat signal according to embodiments.

Generally, the interference segment identifier 306 identifies the one or more segments 307 by comparing at least one of 1) a difference between the beat signal and the reference beat signal, and 2) a derivative of the difference, to one or more thresholds. By way of example, FIG. 9 illustrates a beat signal 910 as a dashed line, and a difference 920 between the beat signal 910 and the reference beat signal 305 as a solid line 920. The beat signal 910 is subject to interference during two time periods 912 and 914. By comparing the difference signal 920 to a threshold 930, the segments 307 may be identified. Notably, it would be much more difficult to identify the segments 307 without first removing the reference beat signal 305 from the beat signal 910.

Figure 8:
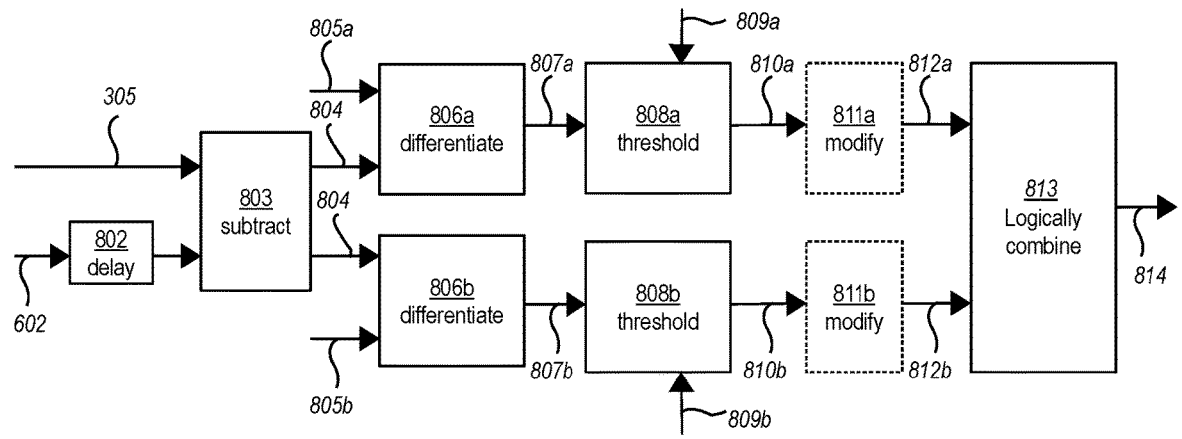
FIG. 8 illustrates how a segment of a beat signal which is subject to interference may be identified according to embodiments.

FIG. 8 illustrates a possible implementation of the interference segment identifier 306 for carrying out step S06 when a beat signal 602 with index m is about to be processed.

The interference segment identifier 306 may, in a subtraction block 803, start by calculating a difference signal 804 between the beat signal 602 and the reference beat signal 305. The difference signal $a_{m,n}=1, \ldots, s$ between the beat signal $x_{n,m}$, $n=1, \ldots, s$, and the corresponding reference beat signal $\bar{x}_{n,m}$, $n=1, \ldots, s$ may be calculated according to:

$$a_{n,m} x_{n,m} - \bar{x}_{n,m}.$$

In order to ensure that the beat signal 602 and the corresponding reference beat signal 305 arrive in time synchronization at the subtraction block 803, the beat signal 602 may be delayed in delay block 802 meanwhile the reference beat signal calculator 304 calculates the reference beat signal 305 as explained above.

In a next step, the interference segment identifier 306 may in the derivative blocks 806a, 806b calculate the absolute value of the difference signal 804 itself or one or more derivatives thereof. The order of the derivatives to be computed are controlled by input parameters 805a, 805b, referred to herein as "$d_{sel}$", which are provided as input to the derivative blocks 806a, 806b. For example, $d_{sel}=0$ may indicate the difference signal itself, $d_{sel}=1$ may indicate a first order derivative, $d_{sel}=2$ may indicate a second order derivative, etc. Even if two derivative blocks are shown in FIG. 8, it is to be understood that the interference segment identifier 306 may be extended to comprise any number of derivative blocks.

The derivative blocks 806a, 806b may calculate the derivatives by calculating differences between consecutive time samples in the difference signal $a_{n,m}$. Using the notation $b_{n,m}=a_{n+1,m}$, $c_{n,m}=a_{n+2,m}$, $d_{n,m}=a_{n+3,m}$, first order derivatives a' can be calculated according to:

$$a_{n,m}' = a_{n,m} - b_{n,m}$$

$$b_{n,m}' = b_{n,m} - c_{n,m}$$

$$c_{n,m}' = b_{n,m} - d_{n,m}$$

second order derivatives a" according to:

$$a_{n,m}'' = a_{n,m}' - b_{n,m}'$$

$$b_{n,m}'' = b_{n,m}' - c_{n,m}'$$

and third order derivatives a''' according to:

$$a_{n,m}''' = a_{n,m}'' - b_{n,m}''.$$

Depending on the values of the input parameters 805a, 805b, the derivative blocks 806a, 806b output signals 807a, 807b which may take the following signal values:

$$v_{n,m}(d_{sel}) = \begin{cases} |a_{n,m}|, & d_{sel} = 0 \\ |a'_{n,m}|, & d_{sel} = 1 \\ |a''_{n,m}|, & d_{sel} = 2 \\ |a'''_{n,m}|, & d_{sel} = 3 \end{cases}$$

For example, by setting $d_{sel}$ to zero for one derivative block 806a, and $d_{sel}$ to one, two, or three for another derivative block 806b, the interference segment identifier 306 will calculate the absolute value of the difference and the absolute value of a first or higher order derivative of the difference.

Next, the interference segment identifier 306 proceeds to compare each of the signals 807a, 807b which are output from the derivative blocks 806a, 806 to respective thresholds 809a, 809b. This is performed by the thresholding blocks 808a, 808b in FIG. 8. In more detail, the thresholding blocks 808a, 808b may each output a signal 810a, 810b which indicates segments for which the absolute value of the difference signal and the absolute value of a derivative of the difference signal (as indicated by the parameters 805a, 805b) exceeds a respective threshold. For example, the output signals 810a, 810b may each be in the form of a bit vector $i_{n,m}$, n=1, ..., s which indicates time samples n for which the absolute value of the difference signal and the absolute value of a derivative of the difference signal (as indicated by the parameters 805a, 805b) exceeds a respective threshold. For example, the bit vector $i_{n,m}$, n=1, ..., s may take the value "1" for those time samples n where the threshold is exceeded, and the value "0" otherwise.

In order to make the interference identification more robust, the interference segment identifier 306 may optionally modify the signals 810a, 810b to provide modified signals 812a, 812b.

Figure 10:
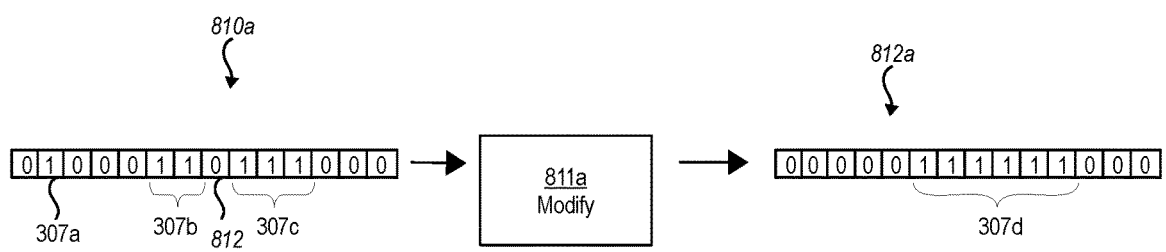
FIG. 10 illustrates modification of a bit vector used to identify segments which are subject to interference according to embodiments.

For example, the interference segment identifier 306 may require that the identified segments indicated by the signals 810a, 810b have a minimum length. The interference segment identifier 306 may check the length of the segments indicated in the signals 810a, 810b, and remove those segments which are shorter than the minimum length. FIG. 10 illustrates the signal 810a in the form of a bit vector. The bit vector indicates two segments—a first segment 307a which is one sample long, a second segment 307b which is two samples long, and a third segment 307c which is three samples long. Suppose that the minimum length is set to two samples. Then, in the example of FIG. 10, the interference segment identifier 306 would remove the sample 307a which is one sample long.

The interference segment identifier 306 may interconnect segments that are closer together than a certain number of samples. For example, suppose that the certain number of samples is two samples. In the example of FIG. 10, the second segment 307b and the third segment 307b are separated by a single time sample 812. Accordingly, the interference segment identifier 306 would interconnect segments 307b and 307c into a common segment 307d, for example, by changing the value of time sample 812 to one instead of zero.

The interference segment identifier 306 may further reduce or extend any segment indicated in the signal 810a by a predefined number of samples. The extension may be performed by assigning the value one to elements which are adjacent to the segment which is to be extended.

The order of the modification operations carried out by the interference segment identifier 306 may be performed in any order.

The interference segment identifier 306 may further, in block 813, logically combine the signals 812a, 812b (or 810a, 810b if the modification blocks 811a, 811b are not present) into a signal 814 which is indicative of the one or more segments 307 which are subject to interference. In particular, in block 813, the interference segment identifier 306 may perform logical "and" or "or" operations on the input signals 812a, 812b. For example, the output signal 814 may indicate a segment for time samples where both the input signal 812a and the input signal 812b indicate a segment. Alternatively, the output signal 814 may indicate a segment for time samples where the input signal 812a and/or the input signal 812 indicate a segment. In particular, two bit vectors $i_{n,m}(d_{sel0})$ and $i_{n,m}(d_{sel1})$ may be combined into a combined bit vector such that it takes the value "1" where at least one of $i_{n,m}(d_{sel0})$ and $i_{n,m}(d_{sel1})$ takes the value "1", and the value "0" otherwise.

The combined bit vector may hence serve as an indicator that identifies the one or more segments 307 of the beat signal $x_{n,m}$ where at least one of the absolute value of the difference signal and the absolute value of a derivative of the difference signal (as indicated by the parameters 805a, 805b) exceeds a respective threshold 809a, 809b.

In step S08, the interference reducer 308 proceeds to reduce the interference in a beat signal by replacing the one or more segments 307 identified by the interference identifier in step S06.

Similar to step S06, and as shown in the flow chart of FIG. 5, the interference reducer 306 may operate in a sequential fashion, such that the beat signals in the sequence 210a are processed one at a time in the order they appear in the sequence 210a.

Generally, the one or more segments 307 may be replaced by a corresponding segment of an adjacent beat signal in the sequence 210a, a corresponding segment of the reference beat signal 305, or a combination thereof. It is to be understood that when several segments 307 have been identified in a beat signal, different replacement strategies may be applied to different segments. For example, a first segment may be replaced by a corresponding segment of the reference beat signal while a second segment may be replaced by an adjacent beat signal. The choice of replacement strategy for a particular segment may depend on whether or not the adjacent beat signal is subject to interference in the corresponding segment.

Figure 11A:
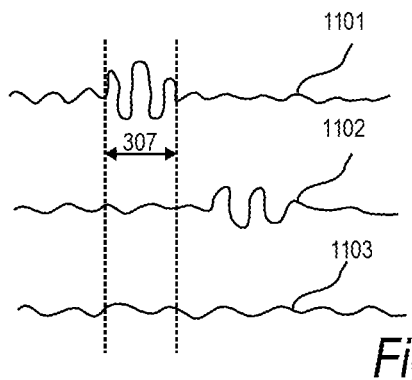
FIGS. 11a-c schematically illustrates replacement of a segment of a beat signal by an adjacent beat signal and/or by a reference beat signal according to embodiments.
Figure 11C:
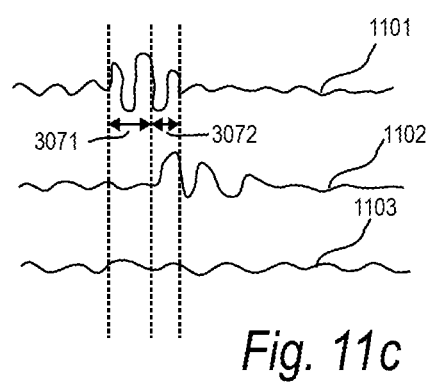
Figure 11B:
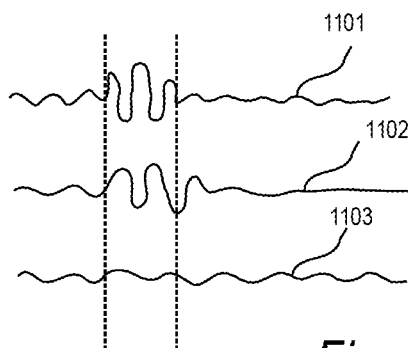

FIGS. 11a-c illustrates three situations that may appear. Each of FIGS. 11a-c, illustrates a currently processed beat signal 1101, a beat signal 1102 which is adjacent to the beat signal 1101 in the sequence 210a of beat signals (i.e., directly before or after the beat signal 1102 in the sequence 110a), and a reference beat signal 1103. The beat signal 1101 is subject to interference in segment 307.

The interference reducer 308 may operate in different modes. In a first mode, the interference reducer 308 replaces the segment 307 of the beat signal 1101 by a corresponding segment of the adjacent beat signal 1102. When operating in the first mode, the interference reducer 308 would replace, in each of FIG. 11a, 11b, 11c, the segment 307 of beat signal 1101 with the corresponding segment of the adjacent beat signal 1102. In the first mode, the segment 307 is always replaced by the corresponding segment of the adjacent beat signal 1102. This may be a problem if the adjacent beat signal 1102 also is subject to interference in the segment 307, which is the case in FIG. 11b, and FIG. 11c.

In a second mode, the interference reducer 308 may therefore only replace the beat signal 1101 with the adjacent beat signal 1102 on a condition that the adjacent beat signal 1102 is not subject to interference in the segment 307. If the adjacent beat signal 1102 is subject to interference in the segment 307, the interference reducer 308 may, when operating in the second mode, instead run a finite-impulse-response, FIR, filter on the beat signal 1101 in segment 307. The FIR-filter may, for example, be a smoothing filter which reduces the interference by smoothing out the interference in the segment 307. When operating in the second mode, the interference reducer 308 would hence replace the segment 307 by the corresponding segment of the adjacent signal 1102 in the example of FIG. 11a, but instead run a FIR-filter in the example of FIG. 11b.

The interference reducer 308 may also combine replacement by the adjacent beat signal 1102 and the application of a FIR-filter within a single segment. As illustrated in FIG. 11c, the segment 307 may be divided into a first portion 3071, and a second portion 3072. The beat signal 1101 may be replaced by the adjacent beat signal 1102 in the first portion 3071 and a FIR-filter may be used in the second portion 3072. This may particularly be the case if the adjacent beat signal 1102 has been found to be subject to interference in a portion corresponding to the second portion 3072, but not in a portion corresponding to the first portion 3071.

It is to be understood that when several segments have been identified for a beat signal, the segments may each be divided into portions depending on where in the segments the adjacent beat signal is subject to interference. For a beat signal there may hence be a plurality of portions 3071, 3072 corresponding to different segments.

In a third mode, the interference reducer 308 only replaces the beat signal 1101 with the adjacent beat signal 1102 on a condition that the adjacent beat signal 1102 is not subject to interference in the segment 307. If the adjacent beat signal 1102 is subject to interference in the segment 307, the interference reducer 308 instead replaces the beat signal 1101 with a corresponding segment of the reference beat signal 1103. Thus, when operating in the third mode, the interference reducer 308 would replace the segment 307 of beat signal 1101 by a corresponding segment of the reference beat signal 1102 in FIG. 11a, and by a corresponding segment of the reference beat signal 1103 in FIG. 11b.

The interference reducer 308 may also combine replacement by the adjacent beat signal 1102 and the reference beat signal 1103 in a single segment. As illustrated in FIG. 11c, the beat signal 1101 may be replaced by the adjacent beat signal 1102 in the first portion 307a and by the reference beat signal 1103 in the second portion 3072. This may particularly be the case if the adjacent beat signal 1102 has been found to be subject to interference in a portion corresponding to the second portion 3072, but not in a portion corresponding to the first portion 3071.

In a fourth mode, the interference reducer 308 always replaces the segment 207 of beat signal 1101 with a corresponding segment of the reference beat signal 1103. Thus, when operating in the fourth mode, the interference reducer 308 will thus replace segment 307 of the beat signal 1101 with the corresponding segment of the reference beat signal 1103 in each of FIGS. 11a, 11b, and 11c.

Figure 12:
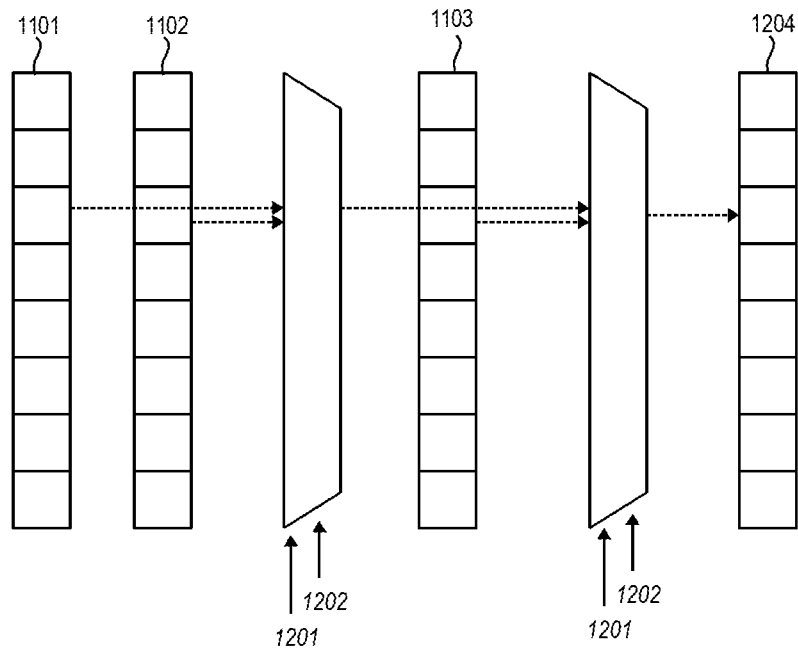
FIG. 12 illustrates how a segment of a beat signal which is subject to interference may be replaced according to embodiments.

FIG. 12 illustrates a possible implementation of the interference reducer 308 when operating in the third mode.

The interference reducer 308 may receive signals 1201, 1202 which are indicative of segments where the beat signal 1101 and the adjacent beat signal 1102 are subject to interference, respectively. The signal 1201 corresponds to signal 814 of FIG. 8.

For time samples where signal 1201 indicates that the beat signal 1101 is subject to interference, but signal 1202 indicates that the adjacent beat signal 1102 is not, the interference reducer 208 replaces the time sample of the beat signal 1101 with that of the adjacent beat signal 1102 in the output signal 1204. For time samples where the signal 1201 indicates that the beat signal 1101 is subject to interference, and signal 1202 indicates that the adjacent beat signal 1102 is also subject to interference, the interference reducer 208 replaces the time sample of the beat signal 1101 with that of the reference beat signal 1103 in the output beat signal 1204.

The resulting output beat signal 1204 will typically have a reduced impact of interference and may be added to the output sequence of beat signals 213a which is output from the interference reduction device 212a.

It will be appreciated that a person skilled in the art can modify the above-described embodiments in many ways and still use the advantages of the present teachings as shown in the embodiments above. For example, when the radar unit has several transmit and receive antennas, the described method may be performed for each transmit and receive antenna combination. Thus, the present teachings should not be limited to the shown embodiments but should only be defined by the appended claims Additionally, as the skilled person understands, the shown embodiments may be combined.

What is claimed is:

1. A method for interference reduction in a stationary radar unit of a frequency-modulated continuous-wave (FMCW) type, comprising:
   receiving a sequence of beat signals corresponding to a first sequence of signals transmitted by a radar unit, each beat signal having a plurality of time samples, wherein each beat signal is a mix of its corresponding signal in the first sequence of signals transmitted by the radar unit and a signal received by a receive antenna of the radar unit in response thereto;
   for a currently processed beat signal in the sequence of beat signals:
   calculating a reference beat signal as an average or a median between a plurality of the beat signals in the sequence of beat signals such that a time sample of the reference beat signal is calculated as an average or median of a corresponding time sample of the plurality of beat signals;
   identifying a segment of one or more consecutive time samples of the currently processed beat signal which is subject to interference from a transmitter which is separate from the radar unit, wherein the segment is identified by comparing at least one of a difference between the currently processed beat signal and the reference beat signal, and a derivative of the difference, to one or more thresholds, wherein each time sample of the reference beat signal is calculated as an average or a median of corresponding time samples of the plurality of beat signals; and
   reducing the interference in the currently processed beat signal by replacing the one or more consecutive time samples of the segment of the currently processed beat signal by corresponding time samples of an adjacent beat signal in the sequence of beat signals or by corresponding time samples of the reference beat signal, wherein the adjacent beat signal is next to the currently processed beat signal in an order of the sequence of beat signals.

2. The method of claim 1, further comprising processing the sequence of beat signals sequentially, wherein the calculating the reference beat signal, the identifying the segment of one or more consecutive time samples of the currently processed beat signal, and reducing the interference in the currently processed beat signal are applied sequentially to beat signals in the sequence of beat signals.

3. The method of claim 2, wherein processing the sequence of beat signals sequentially further comprises sequentially repeating the calculating a reference beat signal, wherein the reference beat signal is calculated as an average or a median of beat signals that either precede a currently processed beat signal in the sequence of beat signals, or precede and include a currently processed beat signal in the sequence of beat signals.

4. The method of claim 3, wherein, when processing a first beat signal in the sequence of beat signals, the reference beat signal is set to be equal to the first beat signal in the sequence of beat signals.

5. The method of claim 1, wherein the first sequence of signals comprises a plurality of signals transmitted by the radar unit within a time frame, wherein the sequence of beat signals comprises a plurality of beat signals corresponding to said plurality of signals transmitted by the radar unit within the time frame, and wherein the reference beat signal is calculated as an average of all of said plurality of beat signals in the sequence of beat signals.

6. The method of claim 1, wherein, in the identifying, the segment is identified as a part of the currently processed beat signal where at least one of the difference and said derivative of the difference deviates from zero by more than a first threshold and a second threshold, respectively.

7. The method of claim 1, wherein, in the reducing the interference, the one or more consecutive time samples of the segment are only replaced by corresponding time samples of an adjacent beat signal if the corresponding time samples of the adjacent beat signal have not been identified as being subject to interference from a transmitter which is separate from the radar unit.

8. The method of claim 1, wherein, in the reducing the interference, the one or more consecutive time samples of the segment of the beat signal are replaced by corresponding time samples of an adjacent beat signal if the corresponding time samples of the adjacent beat signal have not been identified as being subject to interference from a transmitter which is separate from the radar unit, and otherwise the one or more consecutive time samples of the beat signal are replaced by the corresponding time samples of the reference beat signal.

9. The method of claim 1, wherein, in the reducing the interference, one or more consecutive time samples of the segment of the currently processed beat signal is replaced by corresponding time samples of the adjacent beat signal, and one or more consecutive time samples of the segment of the currently processed beat signal is replaced by corresponding time samples of the reference beat signal.

10. The method of claim 9, wherein the adjacent beat signal is identified as being subject to interference from a transmitter which is separate from the radar unit.

11. The method of claim 1, wherein the method is performed for each receive antenna of the radar unit.

12. The method of claim 1, wherein each beat signal has a plurality of time samples indexed by a first index and a second index indicating the order of the beat signal in the sequence of beat signals, wherein the plurality of beat signals in the sequence of beat signals are those that have a lower second index than the currently processed beat signal, and wherein the calculating the reference beat signal as the average or the median between the plurality of beat signals in the sequence of beat signals includes calculating that an n:th time sample of the reference beat signal as an average or median of the n:th time samples of the plurality of beat signals.

13. A device for reducing interference in beat signals generated by a stationary radar unit of a frequency-modulated continuous-wave (FMCW) type, comprising:
a receiver configured to receive a sequence of beat signals corresponding to a first sequence of signals transmitted by the radar unit, each beat signal having a plurality of time samples, wherein each beat signal is a mix of its corresponding signal in the first sequence of signals transmitted by the radar unit and a signal received by a receive antenna of the radar unit in response thereto;
a calculator configured to, for a currently processed beat signal in the sequence of beat signals, calculate a reference beat signal as an average or a median between a plurality of beat signals in the sequence of beat signals such that a time sample of the reference beat signal is calculated as an average or median of a corresponding time sample of the plurality of beat signals;
an identifier configured to identify, for the currently processed beat signal in the sequence of beat signals, a segment of one or more consecutive time samples of the currently processed beat signal which is subject to interference from a transmitter which is separate from the radar unit, wherein the identifier is configured to identify the segment by comparing at least one of a difference between the currently processed beat signal and the reference beat signal, and a derivative of the difference, to one or more thresholds;
wherein the calculator is configured to calculate each time sample of the reference beat signal as an average or a median of corresponding time samples of the plurality of beat signals; and
an interference reducer configured to reduce the interference in the currently processed beat signal by replacing the one or more consecutive time samples of the segment of the currently processed beat signal by corresponding time samples of an adjacent beat signal in the sequence of beat signals or by corresponding time samples of the reference beat signal, wherein the adjacent beat signal is next to the currently processed beat signal in an order of the sequence of beat signals.

14. The device of claim 13, wherein each beat signal has a plurality of time samples indexed by a first index and a second index indicating the order of the beat signal in the sequence of beat signals, wherein the plurality of beat signals in the sequence of beat signals are those that have a lower second index than the currently processed beat signal, and wherein the calculating the reference beat signal as the average or the median between the plurality of beat signals in the sequence of beat signals includes calculating that an n:th time sample of the reference beat signal as an average or median of the n:th time samples of the plurality of beat signals.

15. A frequency-modulated continuous-wave (FMCW) radar system for interference reduction, comprising:
a stationary radar unit comprising:
a transmit antenna configured to transmit a first sequence of signals;
a receive antenna configured to receive a second sequence of signals in response to the first sequence of signals transmitted by the transmit antenna; and
a mixer configured to mix the first sequence of signals and the second sequence of signals to generate a sequence of beat signals; and
the radar system further comprising a device comprising:
a receiver configured to receive a sequence of beat signals corresponding to a first sequence of signals transmitted by the radar unit, each beat signal having a plurality of time samples, wherein each beat signal is a mix of its corresponding signal in the first sequence of signals transmitted by the radar unit and a signal received by a receive antenna of the radar unit in response thereto;

a calculator configured to, for a currently processed beat signal in the sequence of beat signals, calculate a reference beat signal as an average or a median between a plurality of beat signals in the sequence of beat signals such that a time sample of the reference beat signal is calculated as an average or median of a corresponding time sample of the plurality of beat signals;

an identifier configured to identify, for the currently processed beat signal in the sequence of beat signals, a segment of one or more consecutive time samples of the currently processed beat signal which is subject to interference from a transmitter which is separate from the radar unit, wherein the identifier is configured to identify the segment by comparing at least one of a difference between the currently processed beat signal and the reference beat signal, and a derivative of the difference, to one or more thresholds;

wherein the calculator is configured to calculate each time sample of the reference beat signal as an average or a median of corresponding time samples of the plurality of beat signals; and an interference reducer configured to reduce the interference in the currently processed beat signal by replacing the one or more consecutive time samples of the segment of the currently processed beat signal by corresponding time samples of an adjacent beat signal in the sequence of beat signals or by corresponding time samples of the reference beat signal, wherein the adjacent beat signal is next to the currently processed beat signal in an order of the sequence of beat signals, wherein the device is arranged downstream of the radar unit to reduce interference in the sequence of beat signals generated by the mixer.

16. The system of claim 15, wherein each beat signal has a plurality of time samples indexed by a first index and a second index indicating the order of the beat signal in the sequence of beat signals, wherein the plurality of beat signals in the sequence of beat signals are those that have a lower second index than the currently processed beat signal, and wherein the calculating the reference beat signal as the average or the median between the plurality of beat signals in the sequence of beat signals includes calculating that an n:th time sample of the reference beat signal as an average or median of the n:th time samples of the plurality of beat signals.

17. A non-transitory computer-readable medium including computer code instructions stored thereon which, when executed by a device having a processing capability, cause the device to execute instructions for interference reduction in a stationary radar unit of a frequency-modulated continuous-wave (FMCW) type, the instructions causing the device to perform operations comprising:

receiving a sequence of beat signals corresponding to a first sequence of signals transmitted by a radar unit, each beat signal having a plurality of time samples, wherein each beat signal is a mix of its corresponding signal in the first sequence of signals transmitted by the radar unit and a signal received by a receive antenna of the radar unit in response thereto;

for a currently processed beat signal in the sequence of beat signals:

calculating a reference beat signal as an average or a median between a plurality of beat signals in the sequence of beat signals such that a time sample of the reference beat signal is calculated as an average or median of a corresponding time sample of the plurality of beat signals;

identifying a segment of one or more consecutive time samples of the currently processed beat signal which is subject to interference from a transmitter which is separate from the radar unit, wherein the segment is identified by comparing at least one of a difference between the currently processed beat signal and the reference beat signal, and a derivative of the difference, to one or more thresholds, wherein each time sample of the reference beat signal is calculated as an average or a median of corresponding time samples of the plurality of beat signals; and reducing the interference in the currently processed beat signal by replacing the one or more consecutive time samples of the segment of the currently processed beat signal by corresponding time samples of an adjacent beat signal in the sequence of beat signals or by corresponding time samples of the reference beat signal, wherein the adjacent beat signal is next to the currently processed beat signal in an order of the sequence of beat signals.

18. The non-transitory computer-readable medium of claim 17, wherein each beat signal has a plurality of time samples indexed by a first index and a second index indicating the order of the beat signal in the sequence of beat signals, wherein the plurality of beat signals in the sequence of beat signals are those that have a lower second index than the currently processed beat signal, and wherein the calculating the reference beat signal as the average or the median between the plurality of beat signals in the sequence of beat signals includes calculating that an n:th time sample of the reference beat signal as an average or median of the n:th time samples of the plurality of beat signals.

* * * * *